United States Patent [19]

Wunderlich et al.

[11] Patent Number: 4,570,948
[45] Date of Patent: Feb. 18, 1986

[54] PLASTIC PROFILED SEALING ELEMENT FOR HOUSEHOLD REFRIGERATION APPLIANCES

[75] Inventors: Ernst Wunderlich, Hof; Gerd Röbl, Selb, both of Fed. Rep. of Germany

[73] Assignee: Rehau AG and Co., Rehau, Fed. Rep. of Germany

[21] Appl. No.: 633,442

[22] Filed: Jul. 23, 1984

[30] Foreign Application Priority Data

Aug. 1, 1983 [DE] Fed. Rep. of Germany ....... 3327692

[51] Int. Cl.⁴ .............................................. F16J 15/00
[52] U.S. Cl. .............................. 277/226; 277/212 FB
[58] Field of Search ......................... 277/226, 212 FB

[56] References Cited

U.S. PATENT DOCUMENTS 2,607,966  8/1952  Beck ................................... 277/226
3,308,727  5/1967  Hurt .................................... 277/226

FOREIGN PATENT DOCUMENTS 1425493  5/1969  Fed. Rep. of Germany .

Primary Examiner—Robert I. Smith
Attorney, Agent, or Firm—Spencer & Frank

[57] ABSTRACT

A plastic profiled sealing element for household refrigeration appliances, such as freezers, refrigerators, freezer chests, freezer compartments, etc., includes a sealing bellows having a hose-shaped cross section. The sealing bellows is provided with two side walls and a covering wall and is made of a plastic which has been set by means of a softener so as to be continuously flexible. Further, the profiled sealing element is provided with an anchor member made of a plastic of the same or different material hardness, with the sealing bellows and the anchor member being connected with one another to form a unit. The cross sections of the two side walls of the sealing bellows narrow as the side walls rise from the region of the connection of the side walls with the covering wall of the anchor member to approximately half the height of the sealing bellows, so that the side walls become increasingly thinner. Thereafter, the cross sections of the side walls increase again to the edges of the covering wall of the sealing bellows until the side walls again reach approximately their initial cross sections. The side walls, on the one hand, and the covering wall, on the other hand, are kept flexible by means of softeners having different characteristics.

14 Claims, 1 Drawing Figure

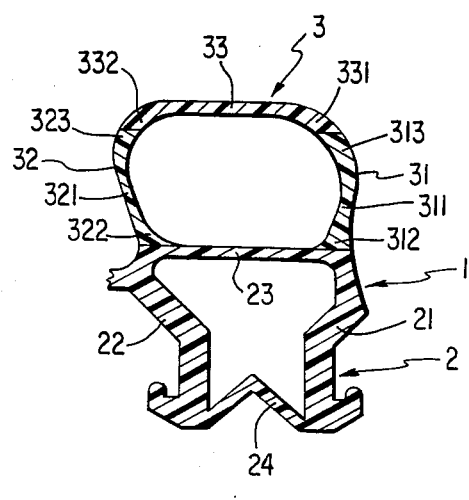

PLASTIC PROFILED SEALING ELEMENT FOR HOUSEHOLD REFRIGERATION APPLIANCES

BACKGROUND OF THE INVENTION

The invention relates to a plastic profiled sealing element for household refrigeration appliances, such as freezers, refrigerators, freezer chests, freezer compartments, etc. the sealing element includes a sealing bellows having a hose-shaped cross section and is constructed of two side walls and a covering wall, the plastic material of the bellows having been set by means of a softener so as to be continuously flexible. The sealing element further includes an anchor member made of a plastic of the same or different material hardness, with the sealing bellows and the anchor member being connected with one another to form a unit.

Such profiled sealing elements are known extensively. The profiled sealing element according to German Pat. No. 1,425,493 may serve as an example. This patent discloses a seal made of an elastic, flexible material, such as rubber, plastic or other elastomers, so that these seals are able to deform and assure the required seal between the appliance and its door even if irregularities exist in the surface of these parts. The described seals may be provided with or without a permanent magnet inserted into the hollow bellows so as to attract a ferromagnetic material in the appliance if the door is placed against it in the closed positon. In this way the sealing member provides the seal itself as well as the lock and thus replaces a mechanical interlock.

The prior art profiled sealing elements could either be set to be flexible when cold or to resist migration of softener. The problem is here that flexibility at low temperatures can be realized only by means of softeners, which have the characteristic of dispersing or migrating considerably, while resistance to softener migration is produced by those softeners which are poorly flexible when cold.

The drawback of the latter setting is primarily that with decreasing temperatures, the elasticity of the profiled sealing element decreases, which may lead to embrittlement. If the softener content of the profiled sealing element is set to be flexible when cold, the particular tendency to migrate inherent in the softener employed must be considered a drawback, with the result that the associated lacquered surfaces of the appliance body or its polystyrene surfaces are subject to attack. Therefore the prior art sealing elements represents a compromise which has been accepted, with the necessary elasticity of the plastics employed for the production of the profiled element being obtained by using softeners which combine a tolerable migration behavior with a tolerable flexibility when cold. For example, extremely soft-set profiled sealing elements have been employed which were manufactured of a polyvinyl chloride that had been softened with a polymer softener. Depending on the requirements for such a profiled sealing element, the compromise accepted between flexibility when cold and resistance to softener migration was more or less tolerable for the intended purposes, but was afflicted in every case with the stated drawbacks so that in addition to the lacquer or polystyrene surfaces being attacked by migrated softener, it had to be expected that the material of the sealing element would become brittle sooner or later.

SUMMARY OF THE INVENTION

The invention has as its object to avoid the compromise made in the prior art and to provide a seal for use in household refrigeration appliances, which, on the one hand, has the characteristic of providing resistance to softener dispersal or migration and, on the other hand, has the required flexibility when cold, without the one characteristic influencing the other characteristic in a negative total effect.

For this purpose, the invention provides that the cross sections of the two side walls of the sealing bellows narrow as the side walls rise from the regions of the connection of the side walls with the covering wall of the anchor member, up to approximately half the height of the sealing bellows, with the walls becoming increasingly thinner. Thereafter the cross sections of the side walls increase again up to the edges of the covering wall, until the side walls reach approximately their initial thicknesses. The two side walls, on the one hand, and the covering wall, on the other hand, are kept flexible by means of softeners having different characteristics. The invention utilizes a combination of sectionally separated sealing sections, with these sections being softened, on the one hand, with softeners that are resistant to migration and, on the other hand, with softeners which are flexible when cold being employed for softening.

The novel sealing element utilizes the advantage that the zones in the sealing element requiring flexibility when cold in order to attain the optimum sealing function are set with cold-flexible softeners, while those portions of the walls of the sealing element which come into contact with softener sensitive contact materials are set with softeners which are resistant to softener migration.

Although it has been known that plastics—and polyvinyl chloride in particular—can be mixed with cold-flexible softeners and thus it was possible to impart the required flexibility at low temperatures to the article produced therefrom, this characteristic had to remain essentially unconsidered in the manufacture of profiled sealing members for household refrigeration appliances because the high softener migration values of these cold-flexible softeners themselves forbade their use.

The partial regions of the novel sealing element which are set to be resistant to softener migration are in direct contact with the lacquered surfaces or the polystyrene of the body of the household refrigeration appliance and are thus not subjected to the low temperatures of the interior of the household refrigeration appliance, or not to the full extent of such temperatures. Thus, in this region, the resistance to migration can be considered more than flexibility when cold since the cold temperatures of the interior of the household refrigeration appliance do not occur at the points of direct contact with the body of the household refrigeration appliance.

The sealing element according to the invention may also be softened with the cold-flexible softener only in the wall of the sealing bellows which is in direct contact with the low temperatures of the interior of the household refrigeration appliance, while the other three wall regions of the sealing bellows may be softened only with the type of softener that is resistant to softener migration. The invention thus utilizes the advantage of employing plastic material which is set to be resistant to softener migration only where this is necessary in profiled sealing members for household refrigeration appliance seals, with plastic material which is set to be flexible when cold being employed only where these characteristics become effective due to contact with low temperatures. In the final effect it cannot be excluded that the two side walls and the covering wall of the sealing bellows are made of soft polyvinyl chloride, with each one of the walls meeting different requirements in that they are set to be flexible by a different softener having the corresponding softener characteristics.

Softener migration resistant softeners that can be employed are polymer softeners of adipic acid, azelaic acid, sebacic acid, each mixed with diols as esterification components. Epoxidized fatty acid esters can also be used here.

Softeners having cold-flexible characteristics may be, for example, esters of dicarbonic acids, e.g. adipic acid, azelaic acid, sebacic acid with n-alkyl alcohols as esterification components or also phosphoric esters, such as, for example, trioctyl phosphate (TOF).

It has been found to be of advantage to thin the side walls so that they are narrowed to approximately one-half the initial wall thickness of the side walls. With this thinning of the walls it is possible to increase the flexibility of the side walls.

The result is that no high contact pressures are required to deform the seal. It moreover appears to be advisable for at least one of the side walls to have primarily cold-flexible characteristics. Reference to the advantages of this arrangement has already been made above. At least the side wall of the sealing element according to the invention directly associated with the low temperatures should thus be kept flexible with a softener which has the desired cold-flexible characteristics. This side wall is in contact neither with lacquered surfaces nor with polystyrene surfaces of the body of the household refrigeration appliance. The expansion of this side wall and its bonding to the covering wall, which is equipped with a softener migration resistant softener, may be such that, in spite of partial migration of softener from the cold-flexibility set side wall to the covering wall, damaging influences are prevented where the covering wall is in contact with lacquered surfaces or parts of the household refrigeration appliance made of polystyrene.

BRIEF DESCRIPTION OF THE DRAWING

The sole drawing FIGURE schematically illustrates a cross sectional view of the profiled sealing element of the present invention.

DESCRIPTION OF THE PREFERRED EMBODIMENT

One embodiment of the profiled sealing element 1 according to the invention is shown schematically in the drawing. The profiled sealing element 1 is comprised of a foot member 2 and a sealing bellows 3. In the illustrated embodiment, foot member 2 is shown as a hollow chamber profile having side walls, 21 and 22 a covering wall 23 and a lower terminating wall 24. The lower terminating wall 24 is designed to extend into the interior of a hollow chamber in the manner of an arrowhead so that a certain spring action can be realized when the profiled sealing member is placed in its operating position. Foot member 2 of profiled sealing member 1 is shaped to correspond to conditions of use. All other known methods for anchoring such profiled sealing members to, for example, the doors of household refrigeration appliances and similar elements, may of course also be used here.

Sealing bellows 3 is attached directly to covering wall 23 of foot member 2. For this purpose, side walls 31 and 32 are fixed to the exterior end regions of covering wall 23. A firm connection may be effected, for example, by way of coextrusion in which the associated wall regions weld together. This welding, and thus a firm bond, also occurs if soft-set wall portions are connected with wall portions not containing softeners or if wall regions which have been soft set by means of a certain softener are connected with softened wall regions containing different softeners. The firm bond can also be effected by gluing or similar connection methods. Both of side walls 31 and 32 are closed toward the top by covering wall 33. The different hatching of side walls 31 and 32 on the one hand and covering wall 33, on the other hand, shows that side walls 31 and 32 are kept flexible by means of a certain softener, e.g. here a cold-flexible softener, while covering wall 33 is provided, for example, with a softener that is resistant to softener migration, or dispersion. If required, only one of the two side walls 31 and 32 may be equipped with the cold-flexible softener and the other, as in covering layer 33, with the softener migration resistant softener.

The drawing also shows the thinning of walls 31 and 32 at portions 311 and 321, respectively; walls 31 and 32 reach their narrowest cross sections at about half the height of the sealing bellows 3. The thinned wall portions 311 and 321 increase again in thickness from this region upwardly toward covering layer 33 and downwardly toward covering layer 23 until they reach the initial wall thicknesses illustrated at 312, 313, 322, and 323. In the illustrated embodiment, the initial wall thickness (313 and 323) of side walls 31 and 32 corresponds to the connecting wall thickness (331 and 332) of covering wall 33. By providing thinned portions 311 and 321, the flexibility of the sealing bellows 3 is advantageously increased in the regions of side walls 31 and 32.

We claim:

1. A profiled sealing element made of plastic for household refrigeration appliances, comprising: an anchor member which is made of plastic material, said anchor member having a covering wall; and a sealing bellows made of plastic material which is set by softeners so as to be continuously flexible, said sealing bellows having a hose-shaped cross section and being provided with a covering wall having edges and two side walls which are connected to the covering wall of the anchor member so that the sealing bellows and the anchor member form a unit, wherein each of the two side walls of the sealing bellows has a wall cross section which converges from the region of the connection of the side wall with the covering wall of the anchor member to approximately half the height of the sealing bellows, so that the side wall becomes increasingly thinner, and which then increases to the edges of the covering wall of the sealing bellows, so that the side wall again attains approximately its initial thickness, and wherein said softeners are such that the side walls, on the one hand, and the covering wall of the sealing bellows, on the other hand, are kept flexible by softeners having different characteristics.

2. A profiled sealing element according to claim 1, wherein the thinning of the side walls progresses until half the initial wall thickness of the side walls is reached.

3. A profiled sealing element according to claim 1, wherein the softener which keeps at least one of the side walls flexible has primarily cold-flexible characteristics.

4. A profiled sealing element according to claim 1, wherein the softener which keeps the covering wall of said sealing bellows flexible has primarily softener migration resistant characteristics.

5. A profiled sealing element for household refrigeration appliances, comprising:
an anchor member having a covering wall; and
a plastic sealing bellows element having an additional covering wall that is spaced apart from said covering wall and having a pair of side walls that connect said additional covering wall to said covering wall, each side wall having a central portion that is thinner than regions thereof that are adjacent one of said covering walls, the plastic of said sealing bellows element including softeners which are distributed so that one of the walls of said sealing bellows element contains a softener with characteristics that are different from a softener contained in at least one other wall of said sealing bellows element.

6. The element of claim 5, wherein each of said side walls joins said additional covering wall at a first end and is connected to said covering wall at a second end, wherein said central portion of each of said side walls is positioned approximately midway between the first and second ends thereof, and wherein said central portion of each of said side walls is approximately half as thick as one of the first and second ends thereof.

7. The element of claim 5, wherein the first end of each side wall is approximately as thick as the second end thereof, and wherein each side wall is configured so as to smoothly taper from its ends to its central portion.

8. The element of claim 5, wherein said additional covering wall contains a softener with migration resistant characteristics and wherein at least one of said side walls contains a softener with cold-flexible characteristics.

9. A profiled sealing element according to claim 1, wherein said anchor member comprises means for insertion into a wall of a refrigeration appliance to secure the sealing element to the appliance.

10. A profiled sealing element according to claim 1, wherein said covering wall of said anchor member and said covering wall of said sealing bellows are substantially parallel.

11. A profiled sealing element according to claim 10, wherein the heights of said side walls are substantially the same.

12. The element of claim 5, wherein said anchor member comprises means for insertion into a wall of a refrigeration appliance to secure the sealing element to the appliance.

13. The element of claim 5, wherein said covering wall and said additional covering wall are substantially parallel.

14. The element of claim 13, wherein the heights of said side walls are substantially the same.

* * * * *